(12) United States Patent
Renfro et al.

(10) Patent No.: US 8,046,089 B2
(45) Date of Patent: Oct. 25, 2011

(54) APPARATUS AND METHOD FOR MODEL PREDICTIVE CONTROL (MPC) OF A NONLINEAR PROCESS

(75) Inventors: Jeffrey G. Renfro, Deer Park, TX (US); Joseph Z. Lu, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 478 days.

(21) Appl. No.: 12/143,354

(22) Filed: Jun. 20, 2008

(65) Prior Publication Data

US 2009/0319059 A1    Dec. 24, 2009

(51) Int. Cl.
  *G05B 13/02*    (2006.01)
  *G06F 7/60*    (2006.01)
  *G06G 7/48*    (2006.01)
(52) U.S. Cl. ............... 700/30; 700/28; 703/2; 703/6
(58) Field of Classification Search ............... 700/28, 700/30, 44
  See application file for complete search history.

(56) References Cited

U.S. PATENT DOCUMENTS

| | | | |
|---|---|---|---|
| 4,616,308 A | * | 10/1986 | Morshedi et al. ............ 700/39 |
| 5,351,184 A | | 9/1994 | Lu et al. |

(Continued)

FOREIGN PATENT DOCUMENTS

EP    0907117 A1    4/1999

(Continued)

OTHER PUBLICATIONS

Dr. Joseph Lu, "Fundamentals of RMPCT", For Honeywell 95' User's Group Meeting, Jun. 14, 1995, 70 pages.

(Continued)

*Primary Examiner* — Kidest Bahta
*Assistant Examiner* — Sivalingam Sivanesan
(74) *Attorney, Agent, or Firm* — Munck Cater, LLP

(57) ABSTRACT

A method includes obtaining a nonlinear process model modeling a nonlinear process to be controlled. The method also includes obtaining an objective function defining how the process is controlled. The method further includes obtaining a control model defining a dynamic feasible region associated with a controlled variable, where the controlled variable is associated with the process. In addition, the method includes controlling the nonlinear process by solving a control problem that includes the process model, control model, and objective function. The dynamic feasible region defined by the control model could represent a funnel region. The objective function could include terms for minimizing and optimizing adjustments to one or more manipulated variables associated with the process. Controlling the nonlinear process could include performing simultaneous control and optimization, where adjustments to the one or more manipulated variables are chosen to meet the control objectives and possibly to optimize and minimize the adjustments.

22 Claims, 3 Drawing Sheets

U.S. PATENT DOCUMENTS

| | | | |
|---|---|---|---|
| 5,566,065 A | 10/1996 | Hansen et al. | |
| 5,570,282 A | 10/1996 | Hansen et al. | |
| 5,682,309 A | 10/1997 | Bartusiak et al. | |
| 5,704,011 A | 12/1997 | Hansen et al. | |
| 5,740,033 A | 4/1998 | Wassick et al. | |
| 5,758,047 A * | 5/1998 | Lu et al. | 700/28 |
| 6,056,781 A | 5/2000 | Wassick et al. | |
| 6,278,899 B1 | 8/2001 | Piche et al. | |
| 6,826,521 B1 | 11/2004 | Hess et al. | |
| 7,702,519 B2 * | 4/2010 | Boyden et al. | 705/348 |
| 2001/0021900 A1 * | 9/2001 | Kassmann | 703/2 |
| 2004/0049295 A1 * | 3/2004 | Wojsznis et al. | 700/28 |
| 2005/0187643 A1 * | 8/2005 | Sayyar-Rodsari et al. | 700/29 |
| 2007/0156259 A1 * | 7/2007 | Baramov et al. | 700/44 |
| 2008/0077257 A1 * | 3/2008 | Peterson et al. | 700/34 |
| 2008/0109100 A1 * | 5/2008 | Macharia et al. | 700/110 |
| 2008/0140227 A1 * | 6/2008 | Attarwala | 700/30 |
| 2008/0188957 A1 * | 8/2008 | Cutler | 700/39 |
| 2009/0240480 A1 * | 9/2009 | Baramov | 703/6 |

FOREIGN PATENT DOCUMENTS

| | | |
|---|---|---|
| EP | 0710902 B1 | 9/1999 |
| WO | WO 2006-086376 A3 | 8/2006 |

OTHER PUBLICATIONS

Charles Zhan, "Some of the New Improvements for RMPCT R200", Presented in APC engine group, Dec. 2000, Honeywell, 38 pages.

J. G. Renfro et al., "Simultaneous Optimization and Solution of Systems Described by Differential/Algebraic Equations", Comput. Chem. Engng., vol. 11, No. 5, pp. 503-511, 1987.

* cited by examiner

APPARATUS AND METHOD FOR MODEL PREDICTIVE CONTROL (MPC) OF A NONLINEAR PROCESS

TECHNICAL FIELD

This disclosure relates generally to control systems and more specifically to an apparatus and method for model predictive control (MPC) of a nonlinear process.

BACKGROUND

Processing facilities are often managed using process control systems. Example processing facilities include manufacturing plants, chemical plants, polymer plants, crude oil refineries, ore processing plants, and paper or pulp manufacturing and processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

Model predictive control (MPC) technology is one type of control technology that has been developed and used in recent years. This type of control technology typically uses a linear model to represent a system to be controlled. A control algorithm uses the model and sensor data or other input data to determine how the system to be controlled is adjusted.

SUMMARY

This disclosure provides an apparatus and method for model predictive control (MPC) of a nonlinear process.

In a first embodiment, a method includes obtaining a nonlinear process model that models a nonlinear process to be controlled. The method also includes obtaining an objective function that defines how the nonlinear process is controlled. The method further includes obtaining a control model that defines a dynamic feasible region associated with a controlled variable, where the controlled variable is associated with the process. In addition, the method includes controlling the nonlinear process by solving a control problem that includes the process model, the control model, and the objective function.

In particular embodiments, the dynamic feasible region defined by the control model represents a funnel region. The funnel region includes a larger first portion and a smaller second portion following the first portion. Greater flexibility is provided in meeting control objectives for controlling the controlled variable in the first portion of the funnel region than in the second portion of the funnel region. The funnel region could be defined in absolute form by an upper reference trajectory and a lower reference trajectory, each of which can have a different initial condition. Also, unforced controlled variable predictions could be determined before the control problem is solved to establish an opening of the funnel region.

In other particular embodiments, the method can also include, when the controlled variable cannot be feasibly controlled within the funnel region, automatically relaxing one or more equations in the control model.

In yet other particular embodiments, the objective function includes at least one term for minimizing adjustments to one or more manipulated variables associated with the process. The objective function also includes at least one economic term for optimizing the adjustments to the one or more manipulated variables.

In still other particular embodiments, controlling the nonlinear process includes performing simultaneous control and optimization. The adjustments to the one or more manipulated variables are chosen to meet the control objectives and also, if possible and adequate flexibility exists, to optimize and minimize the adjustments to the one or more manipulated variables.

In a second embodiment, an apparatus includes a memory configured to store a nonlinear process model that models a nonlinear process to be controlled, an objective function that defines how the nonlinear process is controlled, and a control model that defines a dynamic feasible region associated with a controlled variable (where the controlled variable is associated with the process). The apparatus also includes a processor configured to control the nonlinear process by solving a control problem that includes the process model, the control model, and the objective function.

In a third embodiment, a computer program is embodied on a computer readable medium. The computer program includes computer readable program code for controlling a nonlinear process by solving a control problem that includes a process model, a control model, and an objective function. The nonlinear process model models the nonlinear process to be controlled. The objective function defines how the nonlinear process is controlled. The control model defines a dynamic feasible region associated with a controlled variable, where the controlled variable is associated with the process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
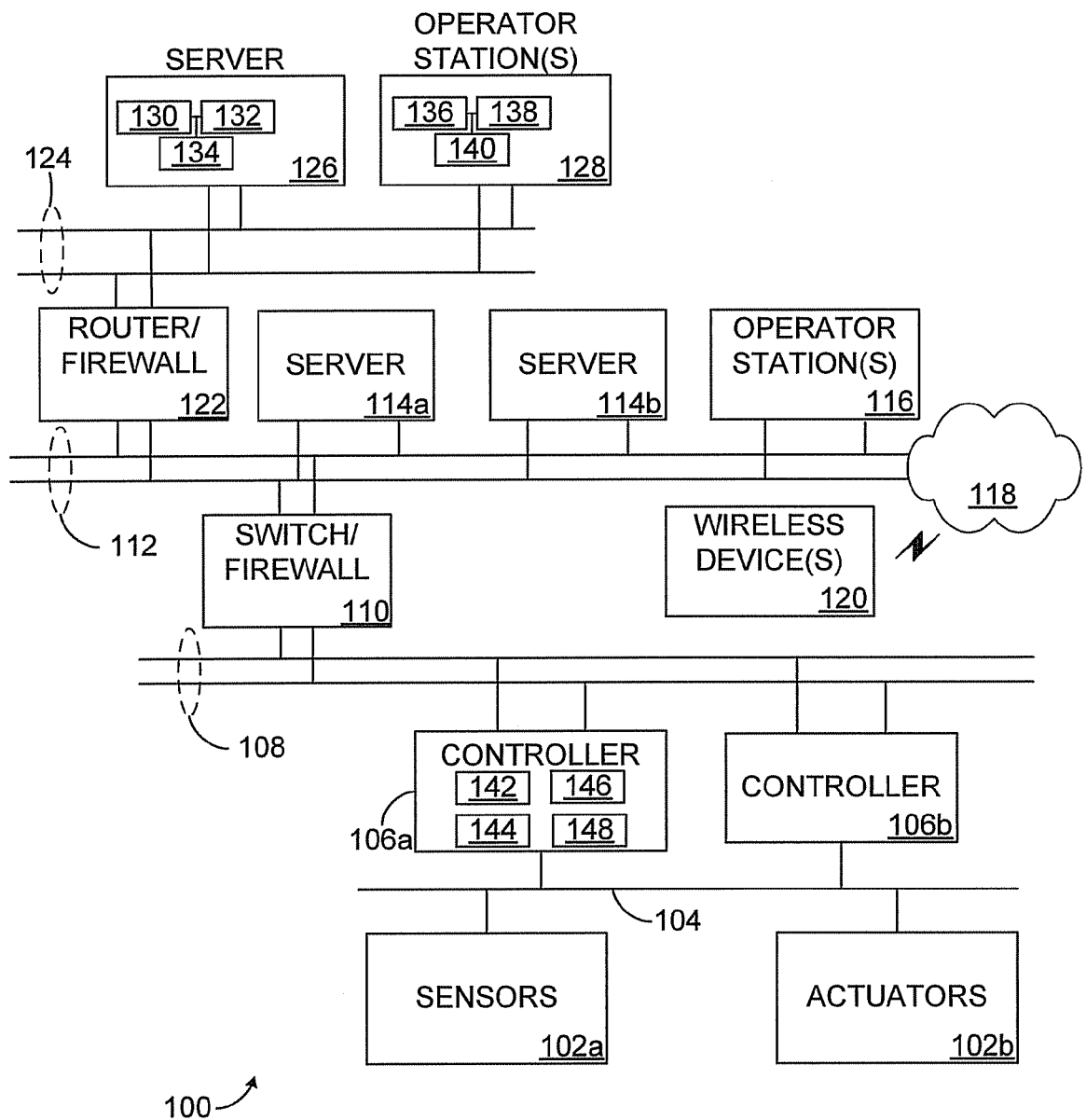
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components that may perform any of a wide variety of functions. For example, the sensors 102a may measure a wide variety of characteristics in a process system, such as temperature, pressure, or flow rate. Also, the actuators 102b may alter a wide variety of characteristics in the process system and may represent components such as heaters, motors, or valves. The sensors 102a and actuators 102b may represent any other or additional components. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent controllers implementing model predictive control (MPC) technology. Moreover, the controllers 106a-106b could use the MPC technology to control a nonlinear process system (or portion thereof) as described in more detail below. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

In one aspect of operation, the controllers 106a-106b use MPC control technology to control one or more nonlinear systems or portions thereof. The MPC control technology is often used to control systems that can be reasonably approximated using linear models. However, a large number of industrial process control problems, such as those involving control of chemical and polymerization reactors, have characteristics (like large process gains and dynamics changes) that make it difficult to achieve the desired control performance with linear MPC technology. Moreover, process control problems where transitions between manufacturing operating regimes occur or where large production rate changes occur can be difficult to handle with linear MPC technology.

In accordance with this disclosure, a nonlinear control algorithm is provided that can, among other things, address the challenges of these types of process control problems. Two important aspects of many modern advanced process control algorithms are the choice of one or more process models 142 and the formulation of one or more control objective functions 144. In this embodiment, the process models 142 include mathematical expressions or other data that model the behavior of one or more nonlinear systems or portions thereof. Also, the objective functions 144 define how one or more processes are controlled using the appropriate process model(s) 142.

In particular embodiments, a process system is associated with controlled, manipulated, and disturbance variables. A controlled variable represents a variable that is monitored by a control system, where the control system attempts to keep the controlled variable between specified upper and lower limits (control objectives). A manipulated variable represents a variable that is adjusted by the control system, where adjustments to the manipulated variable cause changes to the controlled variable. A simple example is a flow rate of material through a pipe (a controlled variable) can be controlled by adjusting an opening of a valve (a manipulated variable). Disturbance variables are variables that can be monitored and taken into account when controlling a controlled variable but that typically cannot be controlled (such as ambient temperature). In these embodiments, a process model 142 can define how one or more controlled variables are related to one or more manipulated and disturbance variables. An objective function 144 can define how one or more manipulated variables are adjusted based on data associated with one or more controlled and disturbance variables.

As described in more detail below, a nonlinear dynamic process model 142 can be incorporated into a process control algorithm that operates using range control. Range control can be generalized to support various nonlinear control problems. This provides a unique and powerful capability to address difficult process control problems that are not handled by current MPC techniques. In particular embodiments, the nonlinear dynamic process model 142 could represent a flowsheet model, which is a collection of dynamic models with a set of connection equations relating inputs and outputs.

In some embodiments, this control technique is implemented by (among other things) defining a control model 146, which represents a set of variables and equations that defines a dynamic feasible region for one or more controlled variables. The dynamic feasible region is represented by a term in the objective function 144 and is where a controlled variable is predicted and controlled in accordance with a defined shape of the dynamic feasible region (such as a funnel shape). The control model 146 can augment the nonlinear dynamic process model 142 and be incorporated into the formulation of a control problem (which is formed by a process model, an objective function, and a control model). For instance, the control problem formulation could include the capability for simultaneous optimization and control through the definition of the objective function 144. The control problem can also be augmented with a feedback model for simultaneously correcting model predictions using process measurements. The control problem could further incorporate feedback implicitly through state and/or disturbance variable inputs to the control problem from a separate state and/or disturbance estimation application.

The control problem can then be submitted to a nonlinear programming (NLP) algorithm 148 for solution. For example, the nonlinear programming algorithm 148 can receive and solve the control problem and then output the solution. A controller can receive measurement data, form and submit the control problem to the non-linear programming algorithm 148, and implement the solution from the non-linear programming algorithm 148. This process can be repeated at a specified frequency that is appropriate for achieving the specified control objectives. Although not shown, the nonlinear programming algorithm 148 implementing this functionality could reside in a higher-level controller in the process control system 100 and provide its outputs to intermediate or lower-level controllers, which can implement the control actions defined by the outputs.

Additional details regarding the operation of the controllers are provided below. Each process model 142 includes any suitable information modeling the behavior of a nonlinear system or portion thereof. Each objective function 144 includes any suitable information defining how a process or portion thereof is controlled. Each control model 146 includes any suitable information defining the dynamic feasible region for one or more controlled variables. Each nonlinear programming algorithm 148 includes any suitable hardware, software, firmware, or combination thereof for solving one or more nonlinear control problems.

Although FIG. 1 illustrates one example of a process control system 100, various changes may be made to FIG. 1. For example, a control system could include any number of sensors, actuators, controllers, servers, operator stations, networks, models, objective functions, control problems, and applications. Also, the makeup and arrangement of the process control system 100 are for illustration only. Components could be added, omitted, combined, subdivided, or placed in any other suitable configuration according to particular needs. In addition, FIG. 1 illustrates one operational environment in which nonlinear control can be achieved. This functionality could be used in any other suitable device or system.

Figure 2:
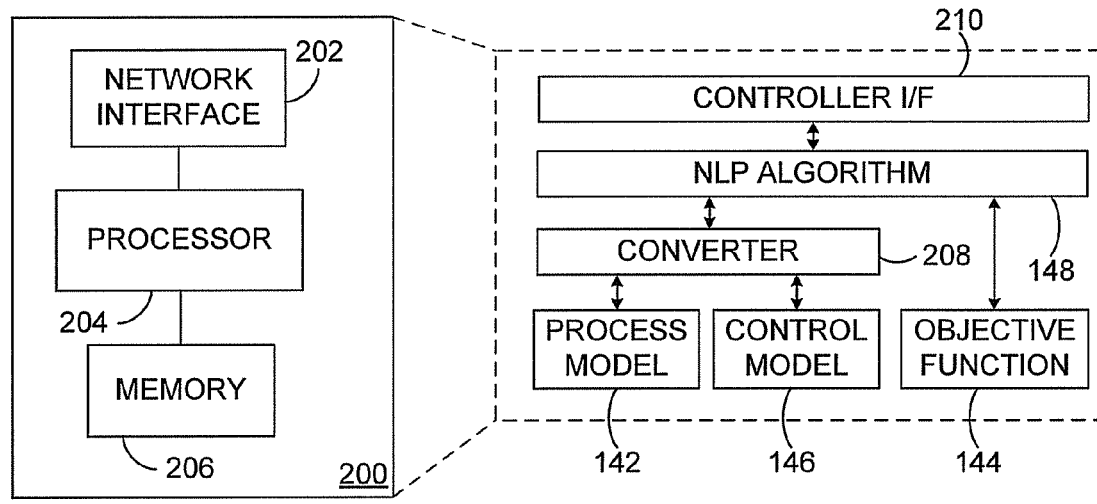
FIG. 2 illustrates an example controller for model predictive control of a nonlinear process according to this disclosure.

FIG. 2 illustrates an example controller 200 for model predictive control of a nonlinear process according to this disclosure. The controller 200 could, for example, represent the controllers 106a-106b operating in the process control system 100 of FIG. 1. The embodiment of the controller 200 shown in FIG. 2 is for illustration only. Other embodiments of the controller 200 could be used without departing from the scope of this disclosure.

As shown in FIG. 2, the controller 200 includes one or more network interfaces 202. The network interfaces 202 allow the controller 200 to communicate over one or more networks, such as the network 104 in FIG. 1. The network interfaces 202 allow the controller 200 to, for example, receive sensor measurements from one or more sensors 102a and to provide control signals for adjusting one or more actuators 102b. Each network interface 202 represents any suitable structure facilitating communication over a network, such as an Ethernet interface, a HART interface, or a FOUNDATION FIELDBUS interface.

The controller 200 also includes one or more processors 204 and one or more memories 206. In this example, the one or more processors 204 can execute instructions and use data generated, collected, or received by the controller 200. These instructions could include the nonlinear programming algorithm 148. The one or more processors 204 include any suitable device(s) for executing or providing logic functions, such as one or more microprocessors, microcontrollers, field programmable gate arrays, or other device(s). The one or more memories 206 store the instructions and data used, generated, collected, or received by the processor(s) 204, such as the process model 142, the objective function 144, and the control model 146. The one or more memories 206 could also store the instructions forming the nonlinear programming algorithm 148. The one or more memories 206 include any suitable volatile and/or non-volatile storage and retrieval device or devices.

The items in the dashed lines in FIG. 2 denote different components implemented or used in the controller 200, such as data stored in the memory 206 (like the models 142 and 146 and the objective function 144) and software components executed by the processor 204 (like the NLP algorithm 148). As shown here, the controller 200 also includes a converter 208 and a controller interface 210. The converter 208 operates to convert the process and control models 142 and 146 into a different form accepted by the NLP algorithm 148. For example, the converter 208 could convert process and control models 142 and 146 expressed in differential equation form into a difference equation form. If the models 142 and 146 are in an acceptable form already, the converter 208 may be omitted or not used in the controller 200. The converter 208 includes any hardware, software, firmware, or combination thereof for converting one or more models from one form to another. The converter 208 could, for example, represent a NOVA DAE system from HONEYWELL INTERNATIONAL INC.

The controller interface 210 denotes an interface for outputting a solution to a control problem from the NLP algorithm 148. As noted above, the outputs could be provided from the controller 200 to lower-level controllers in a process control system for implementation. The outputs could also be provided directly to actuators or other devices for implementing the solution. The controller interface 210 includes any hardware, software, firmware, or combination thereof for interacting with the controller 200. The controller interface 210 could, for example, represent a NOVA interface from HONEYWELL INTERNATIONAL INC. In addition, the NLP algorithm 148 here could represent a NOVA optimization system from HONEYWELL INTERNATIONAL INC.

As described in more detail below, the controller 200 operates to provide MPC control of nonlinear systems (or portions thereof). This can be done in a way that satisfies control problem objectives with a reduced or minimum amount of manipulated variable movements. It can also be done in an improved or even mathematically optimal way. In addition, the controller 200 can provide a framework that may be used to incorporate general nonlinear state-space models, which can include differential/algebraic equation models developed from engineering first principles. This can provide a powerful capability to utilize and leverage sophisticated engineering models for use in control and optimization applications. Alternatively to or in conjunction with engineering first principles models, the framework also may be used to incorporate linear or nonlinear empirical dynamic models. It can also allow for the incorporation of dynamic optimization into problem formulation in a natural way.

The controller 200 generally operates to predict future values of one or more controlled variables and make adjustments to one or more manipulated variables so that control objectives are satisfied. In general, the controller 200 can use a reference trajectory formulation of control error. Control error generally refers to the violation of a specified dynamic feasible region defined by the control model 146 and is a mismatch between the value that a controller expects a controlled variable to obtain in the future and the actual value that the controlled variable obtains. In some embodiments, the controller 200 implements range control that uses a funnel formulation for control error.

Figure 3:
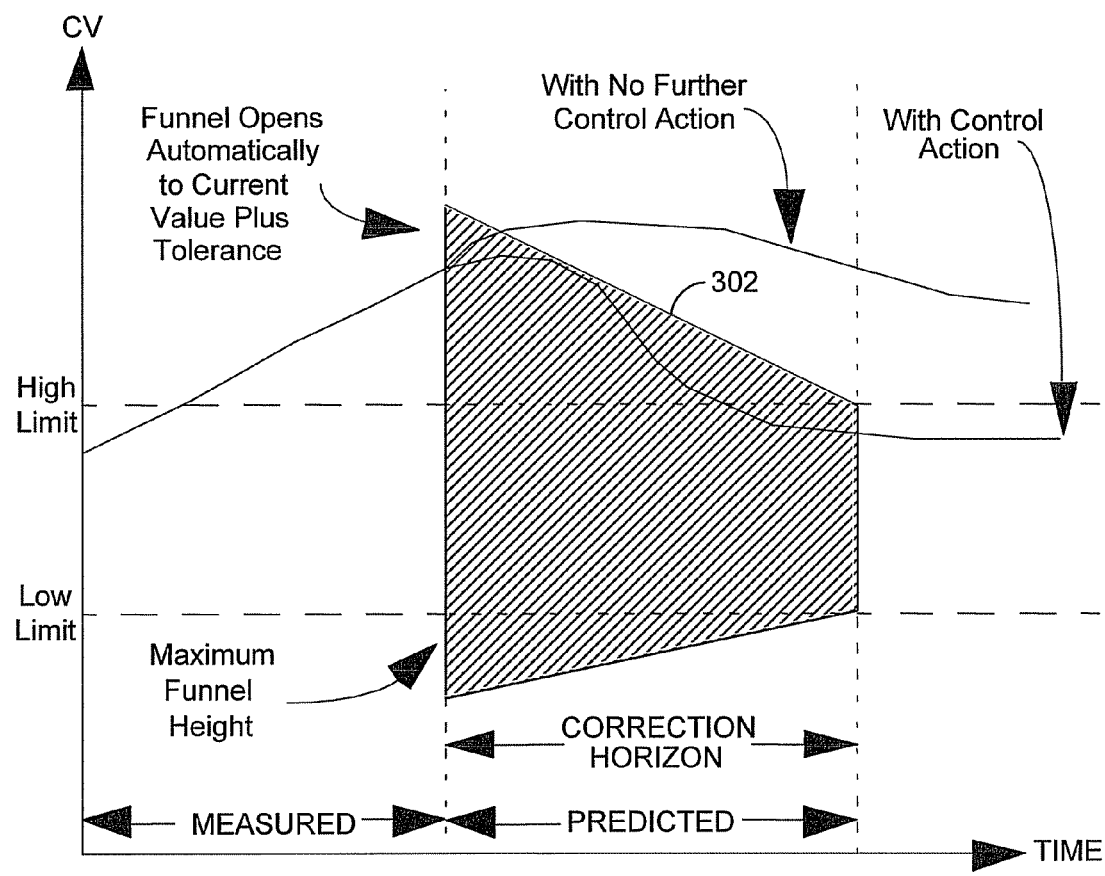
FIG. 3 illustrates an example dynamic feasible region for use by a controller performing model predictive control of a nonlinear process according to this disclosure.

An example of this is shown in FIG. 3, where a dynamic feasible region (a funnel region 302) defines the reference trajectory region for control error. This funnel region 302 defines an area where flexibility is provided in meeting control objectives during the initial portion of a controlled variable's trajectory in the funnel region 302. During the latter portion of the controlled variable's trajectory in the funnel region 302, there is less flexibility in terms of how the control objectives are met. During the earlier portion of this region 302, there are often multiple choices of control moves (adjustments to manipulated variables) that can be selected to meet the control objectives. Since there can be multiple choices of control moves here, the solution with the minimum move (change) to one or more manipulated variables could be selected if no other control objectives are specified. This minimum-move solution could be obtained implicitly or automatically via the choice of the factorization method used in a quadratic programming solution (which could be implemented by the nonlinear programming algorithm 148). Also, thresholding can be used here to avoid ill-conditioning. In particular embodiments, the use of range control using a funnel region 302 could be provided as an option in the controller 200, allowing multiple types of control techniques to be provided to an operator.

The following provides additional details regarding one example implementation of the controller 200. These details are provided for illustration and explanation only. Other embodiments of the controller 200 could be implemented that depart from this example. Also, Table 1 provides an overview of certain variables used in the following discussion.

TABLE 1

| Variable | Description |
| --- | --- |
| Φ | Controller objective function |
| A | Step response matrix |
| Y | Controlled variables (CVs) |
| U | Manipulated variables (MVs) |
| $y_u$ | Unforced CV response |

TABLE 1-continued

| Variable | Description |
|---|---|
| r | MV constraint slack variables |
| W | Weights for CV prioritization |
| T | Weights for MV feasibility |
| S | Summation operator matrix |
| Q | Equal to $W^T W$ (T superscript denotes transpose) |
| $y_{min}$ | CV lower limits |
| $y_{max}$ | CV upper limits |
| $u_{min}$ | MV lower limits |
| $u_{max}$ | MV upper limits |
| $\Delta u$ | MV changes |
| $\Delta u_{min}$ | $\Delta$MV lower limits |
| $\Delta u_{max}$ | $\Delta$MV upper limits |

The value of S (the summation operator matrix) could be expressed using the following matrix:

$$\begin{bmatrix} 1 & & & & & & & & 0 \\ \vdots & \ddots & & & & & & & \\ 1 & \cdots & 1 & & & & & & \\ & & & \vdots & \ddots & & & & \\ & & & 1 & \cdots & 1 & & & \\ & & & & & & \vdots & \ddots & \\ & & & & & & 1 & \cdots & 1 \\ & & & & & & \vdots & & \ddots \\ 0 & & & & & & 1 & \cdots & 1 \end{bmatrix}.$$

To implement range control in the controller 200, the range control problem is formulated so that hard constraints are used with manipulated variables. As a result, the range control problem could be initially expressed as:

$$\min \Phi = \frac{1}{2} e^T Q e \quad (1)$$

subject to:

$$y = A\Delta u + y_u + e \quad (2)$$

$$u = u_0 + S\Delta u \quad (3)$$

$$y_{min} \leq y \leq y_{max} \quad (4)$$

$$u_{min} \leq u \leq u_{max} \quad (5)$$

$$\Delta u_{min} \leq \Delta u \leq \Delta u_{max}. \quad (6)$$

Here, e represents the model error.

In some embodiments, when a controlled variable's ranges cannot be satisfied, the controller 200 relaxes control error equations to achieve feasibility. In other words, the controller 200 satisfies the model equations (model 142) and relaxes the control model equations (model 146), and predictions of the controlled variable may not be biased with a feasibility error. This approach is valid for linear and nonlinear models. As a result, the range control problem can now be expressed as:

$$\min \Phi = \frac{1}{2} e^T Q e \quad (7)$$

subject to:

$$y = A\Delta u + y_u \quad (8)$$

$$u = u_0 + S\Delta u \quad (9)$$

$$y_{min} \leq y + e \leq y_{max} \quad (10)$$

$$u_{min} \leq u \leq u_{max} \quad (11)$$

$$\Delta u_{min} \leq \Delta u \leq \Delta u_{max}. \quad (12)$$

Here, slack is provided in the controlled variable's feasibility constraint (Equation 10) as opposed to in the model equations (Equation 8).

As noted above, the controller 200 can be implemented in a manner that provides reduced or minimal movements to manipulated variables during the control of controlled variables. In some embodiments, minimum movement is determined using a norm, such as an $L_1$ norm or an $L_2$ norm (note that any $L_p$ norm could be used, where $p \geq 1$). In some particular embodiments, minimum movements can be achieved by using singular value decomposition (SVD) as the factorization method in the quadratic programming (QP) solution implemented by the nonlinear programming algorithm 148.

In other particular embodiments, the minimum movement problem is explicitly formulated in the objective function 144. This can be done, for example, using pivot tolerances and constraint relaxation (QP "expand" technology) to emulate SVD thresholding. As a particular example, this problem could be solved as a multi-level optimization that involves (i) resolving controller error and (ii) solving the minimum movement problem subject to constraints imposing an optimal solution for controller error. In other words, level (i) involves solving the control problem for an optimal solution $\Delta u^*$ with an objective function $\Phi e^*$, and level (ii) involves solving the minimum movement problem subject to maintaining the optimal control error constraint. The level (i) problem could therefore be expressed as:

$$\min \Phi_e = \frac{1}{2} e^T Q e \quad (13)$$

subject to Equations (8)-(12). The level (ii) problem could be expressed as:

$$\min \Phi_u = \frac{1}{2} \Delta u^T \Lambda \Delta u \quad (14)$$

subject to Equations (8)-(12) and:

$$\Phi_e \leq \Phi^*_e. \quad (15)$$

Here, $\Lambda$ represents a positive definite weighting matrix.

This type of multi-level problem may require a highly-parametric solver, which can sometimes raise efficiency issues. Also, an optimal solution constraint is often quadratic (a linear form could exist if errors only are constrained). Alternatively, optimal errors can be constrained to replace the quadratic constraint. Because of this, in other embodiments, the minimum movement problem can be formulated using a composite objective function (rather than as a multi-level problem). This can be done, for example, by adding a quadratic regularization term to the control objective function 144. This can achieve, for instance, a squared $L_2$ norm minimum movement solution. The positive definite weighting matrix $\Lambda$ can be included in the formulation for generality and can be small (so that it does not compete with control error term). The range control problem could therefore be expressed as:

$$\min \Phi = \frac{1}{2} e^T Q e + \frac{1}{2} \Delta u^T \Lambda \Delta u \quad (16)$$

subject to Equations (8)-(12).

Note that the minimum movement problem could have multiple solutions (multiple sets of manipulated variable moves that give the same minimum movement objective function value). When a solution is not unique, the $L_2$ norm for minimum movement may spread or "smear" the moves across multiple manipulated variables. This could cause a large number of manipulated variables to be adjusted slightly, even though a single adjustment to a single manipulated variable could also have satisfied the control problem. In some embodiments, when the solution is not unique, the $L_1$ norm for minimum movement can be used since it distributes the moves amongst the fewest manipulated variables. The range control problem with an explicit $L_1$ norm minimum movement term can therefore be expressed as:

$$\min \Phi = \frac{1}{2} e^T Q e + \|D \Delta u\|_1 \quad (17)$$

subject to Equations (8)-(12). Here, D represents a manipulated variable move cost diagonal matrix.

As noted above, different norms are available for use in determining different values in the controller 200. In some embodiments, the error associated with the control model 146 is determined using a weighted $L_1$ norm and is minimized. In light of this, the range control problem can be expressed as:

$$\min \Phi = \|We\|_1 + \|D \Delta u\|_1 \quad (18)$$

subject to Equations (8)-(12).

Also as noted above, FIG. 3 illustrates the funnel or reference trajectory region used by the controller 200. Two limits, $y_{min}$ and $y_{max}$, may represent the time-dependent limits that form the dynamic feasible region, which in this case is a funnel. These limits can be viewed as forming a high setpoint (SPHI) and low setpoint (SPLO) reference trajectory in general terms. The reference trajectory formulation can be implemented in absolute form, and separate weights ($w_{max}$ and $w_{min}$) can be used for penalizing upper and lower reference trajectory constraint violations. Note that SPHI and SPLO violations could have different priorities or weights depending on the circumstances. In light of this, the range control problem can be expressed in an equivalent $L_1$ norm formulation as follows:

$$\min \Phi = w_{max}^T e_{max} + w_{min}^T e_{min} + \mu d^T \Delta u^{abs} \quad (19)$$

subject to Equations (8), (9), (11), and (12) and the following:

$$y - y_{max} - e_{min} + s_{min} = 0 \quad (20)$$

$$y_{min} - y - e_{min} + s_{min} = 0 \quad (21)$$

$$e_{min} \geq 0, e_{max} \geq 0, s_{min} \geq 0, s_{max} \geq 0 \quad (22)$$

$$\Delta u - \Delta u^+ + \Delta u^- = 0 \quad (23)$$

$$\Delta u^a - \Delta u^+ - \Delta u^- = 0 \quad (24)$$

$$\Delta u^{abs} = E \Delta u^a \quad (25)$$

$$\Delta u^+ \geq 0, \Delta u^- \geq 0. \quad (26)$$

The objective function 144 in the controller 200 can further include an economic term, which can be used for simultaneous optimization when multiple controlled variables are feasible. The objective function 144 can therefore be modified to include this economic term $\Phi_c$ as follows:

$$\min \Phi = \mu_e \Phi_e + \mu_c \Phi_c + \mu_u \Phi_u \quad (27)$$

where:

$$\Phi_e = w_{max}^T e_{max} + w_{min}^T e_{min} \quad (28)$$

$$\Phi_c = c_y^T y + c_u^T u \quad (29)$$

$$\Phi_u = d^T \Delta u^{abs} \quad (30)$$

Here, $\mu_e$ denotes the relative weight for the control error term, $\mu_c$ denotes the relative weight for the economic cost term, and $\mu_u$ denotes the relative weight for the minimum movement term. The $\Phi_c$ term here is shown to be linear for simplicity, but in general it could be a nonlinear economic objective term. Note that the objective function in Equation (27) can also be made subject to Equations (20)-(26) and the following general nonlinear dynamic model:

$$f(y, u) = 0. \quad (31)$$

This nonlinear dynamic model could represent a nonlinear discrete dynamic model or a continuous time formulation. Equation (27) (and those equations that are subject to Equation 27) therefore form the objective function 144 used in the controller 200. The nonlinear programming algorithm 148 could then use any suitable nonlinear problem solving technique to solve the control problem formed by the objective function 144 and the models 142 and 146.

To form the funnel region 302 shown in FIG. 3, the following pseudo-code could be used to determine the opening size of the funnel:

```
move_up = 0
move_down = 0
If ( cv.sphi < cv.t[∞] ) Then
    move_down = cv.t[∞] − cv.sphi
Else If ( cv.splo > cv.t[∞] ) Then
    move_up = cv.splo − cv.t[∞]
End If
zsphi = MAX( cv.splo, cv.t[1] + move_up/2 ) + funnel_min
zsplo = MIN( cv.sphi, cv.t[1] − move_down/2 ) − funnel_min
funnel_hi = MAX( cv.sphi, zsphi ) + move_down/2
funnel_lo = MIN( cv.splo, zsplo ) − move_up/2
Here:
    cv.sphi = controlled variable sphi limit
    cv.splo = controlled variable splo limit
    cv.t[∞] =  unforced controlled variable value at steady state
    cv.t[1] =  unforced controlled variable value at end of interval
               #1
    zsphi = local variable for sphi funnel initial condition
    zpslo = local variable for splo funnel initial condition
    move_up = amount of cv.splo violation at steady state
    move_down = amount of cv.sphi violation at steady state
    funnel_min =  funnel parameter to configure a minimum amount to
                  adjust funnel
    funnel_hi = sphi funnel initial condition
    funnel_lo = splo funnel initial condition
```

Note that this calculation depends on computing the unforced controlled variable prediction before the control problem is solved. While possible for nonlinear systems (such as by using a parametric solution), it may be impractical in some implementations. Therefore, if necessary, the unforced controlled variable calculation can be estimated using faster calculations. For example, steady-state calculations based on current manipulated and disturbance variables could be used instead of a dynamic simulation. This may neglect consideration of near-term dynamic violations, but it can provide relatively accurate estimations of future violations with reduced or minimal computational load increases (such as 5% or less).

The closure of the funnel region 302 can be determined using a continuous formulation of the funnel, where the continuous formulation can be integrated over a normal prediction horizon. This can be done, for example, using continuous differential equations (such as differential equations defining a first-order or fourth-order funnel system). In addition, within the funnel region 302, prediction of controlled variable values may occur during multiple time blocks. In some embodiments, prediction errors may or may not be penalized during particular time blocks. For instance, prediction errors might not be penalized during the first four (or other configurable number of) time blocks of the funnel. Of course, prediction errors could also be penalized during all time blocks of the funnel.

In some embodiments, it may be desirable to limit responses of the controller 200, such as to provide slower responses rather than faster responses to changing conditions. This can be accomplished in various ways, such as parameterizing the funnel trajectory so that it allows tighter control for slower tuning. Other techniques could include using controlled variable "rate of change" limits or adding constraints that impose a "band" for average rate of change for controlled variables over the open part of funnel.

A desired closed-loop response time is a quantity that is often required in the calculations to define the coincidence point for the funnel region 302 (the point where the funnel region meets the requested setpoint limits for a controlled variable). The closed-loop response time of the controller 200 can be determined from a specified performance ratio and a gain-weighted open-loop response time for each controlled variable. Some implementations of the controller 200 could involve the computation of a characteristic open-loop response time for each controlled variable. If not practical in certain implementations, the open-loop response time can be determined based on the process model 142, and the closed-loop response time can be calculated by use of the performance ratio. Alternatively, the closed-loop response time can be specified as is done in the configuration of PROFIT NLC provided by HONEYWELL INTERNATIONAL INC.

Controller procrastination refers to the deferral or delay of moves to a future time interval, even when error is present at the current time interval. The controlled variable response can become insensitive to the tuning factor used if the requested closed-loop response time is slower than the open-loop response time. This is due to the funnel region 302 being wide and permitting fast solutions with lower minimum movements. This can be a benefit when a disturbance enters the system that drives the controlled variable back to range faster (no penalty for this). However, deferring moves into the future when there is current error might be confusing to operators using the controller 200. As a result, it may be preferable for the controller 200 to perform moves sooner, rather than deferring to later intervals.

Since the funnel region's initial condition is based on the controlled variable's initial condition, if the controlled variable's initial condition does not change with time, the funnel region's initial condition also does not change with time. To avoid solving the same problem over and over again (which defers movement), the minimum movement objective function 144 can be modified to construct incentives for implementing minimum moves as soon as possible. One way the minimum movement objective function 144 can be modified is as follows:

$$\Phi_u = d^T \Delta u^{abs} = \sum_{i=1}^{nmv} d_i \Delta u_i^{abs} \text{ where:} \quad (32)$$

$$\Delta u_i^{abs} = z^T \Delta u_i^a \quad (33)$$

$$D = \text{diag}(d_i) \quad (34)$$

$$z^T = [1, 1, 1 \ldots 1, 1] \quad (35)$$

$$z \in \Re^{n_c}. \quad (36)$$

Another approach is to add a time weighting to the manipulated variable minimum movement term so that, for a given minimum movement, movements in the future cost more to make. The time weighting vector z can be redefined to weight future minimum movement changes based on time. A parameter σ weights movements in the future move heavily. The minimum movement objective function 144 can then be expressed as follows:

$$\Phi_u = d^T \Delta u^{abs} = \sum_{i=1}^{nmv} d_i \Delta u_i^{abs} \quad (37)$$

where:

$$\Delta u_i^{abs} = z^T \Delta u_i^a \quad (38)$$

$$D = \text{diag}(d_i) \quad (39)$$

$$z^T = [1, 1+\sigma, 1+2\sigma \ldots , 1+(n_c-1)\sigma] \quad (40)$$

$$z \in \Re^{n_c}. \quad (41)$$

Moreover, it is possible that the controller 200 could occasionally experience a condition known as steady-state infeasibility. This can occur when a controlled variable is initially infeasible. The funnel region 302 opens based on the controlled variable, and the controlled variable is not brought into steady-state feasibility. During the next cycle, the funnel region opens again, and the controlled variable is again not brought into steady-state feasibility. This process may repeat in a cycle until enough moves are implemented to achieve controlled variable feasibility. This creates a problem in that the effective closed-loop time constant is longer than the specified time constant (due to the re-initialization of the funnel initial conditions). Various approaches could be used to resolve this problem, such as using the last future move from a previous cycle to compute the controlled variable's steady state. Beyond that, a minimum tuning factor can be specified for modifying the funnel region for individual controlled variables or groups of controlled variables.

In addition, the controller 200 may implement multiple control techniques. These can include nonlinear control using range control (discussed above), as well as other conventional or proprietary control techniques (such as PROFIT NLC control). In these embodiments, the controller 200 could actually switch between control techniques during its operation, such as in response to user commands.

To summarize, the implementation of the controller 200 described above provides a control technique that uses range control for handling control error formulation. Manipulated variable limits can be treated as hard constraints, and the minimum movement problem can be explicitly posed. The control model 146 can be relaxed (instead of the process model 142) when a controlled variable is not feasible. An $L_1$ norm of the control error can be minimized, and the $L_1$ norm can be used for the minimum movement problem. Funnel formulation can be implemented as reference trajectory ranges with tunable initial condition spread. Unforced controlled variable predictions can be computed before the control problem 146 is solved to establish the funnel opening. The funnel reference trajectory can be implemented in absolute terms, reference trajectory violations can be minimized, and initial conditions need not coincide. Continuous approximations can be used with the funnel to allow for coincidence of the funnel at a point not computed explicitly, and the performance ratio can be approximated. In addition, a uniqueness formulation can be used to select the minimum movement solution.

The controller 200 implemented in this manner can provide various benefits. For example, the controller 200 can accurately control a process system even in the presence of severe mismatch between the process model dynamics and the actual system dynamics. As a particular example, when using a sixth-order model with a first-order reference system, traditional control systems would provide poor control solutions (such as very oscillatory manipulated variable moves that cannot be eliminated using tuning changes). Even in this situation, the controller 200 could provide very good manipulated variable moves, and the flexibility provided by the funnel region 302 still allows minimum movement solutions.

Although FIG. 2 illustrates one example of a controller 200 for model predictive control of a nonlinear process, various changes may be made to FIG. 2. For example, the controller 200 could be implemented in any suitable hardware, software, firmware, or combination thereof. Also, multiple interfaces, processors, and/or memories could be used in the controller 200. Although FIG. 3 illustrates one example of a dynamic feasible region for use by a controller performing model predictive control of a nonlinear process, various changes may be made to FIG. 3. For instance, the funnel region 302 could have any suitable size and shape, and the lines representing the controlled variable's values could follow any suitable path.

Figure 4:
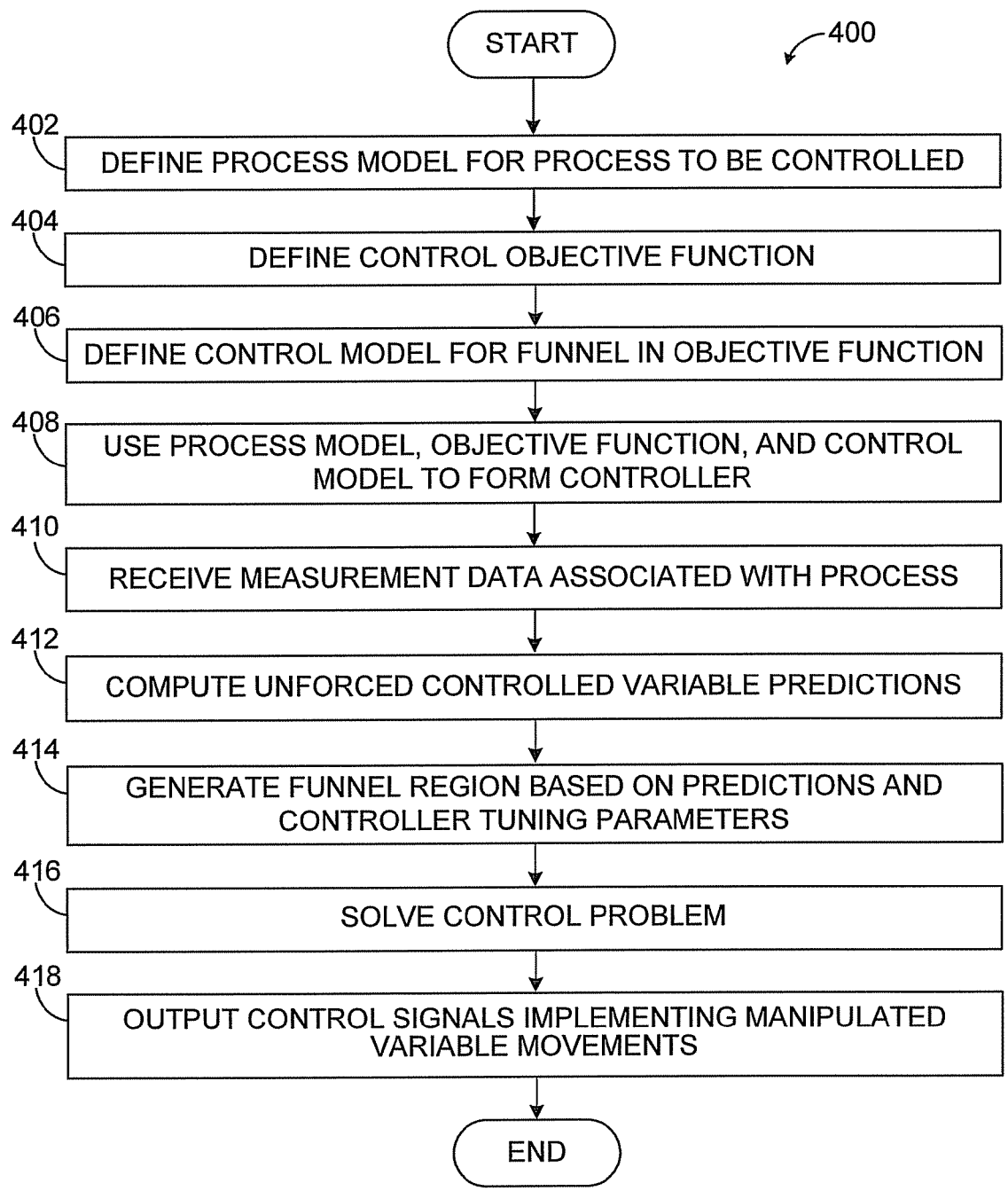
FIG. 4 illustrates an example method for model predictive control of a nonlinear process according to this disclosure.

FIG. 4 illustrates an example method 400 for model predictive control of a nonlinear process according to this disclosure. The embodiment of the method 400 shown in FIG. 4 is for illustration only. Other embodiments of the method 400 could be used without departing from the scope of this disclosure.

A process model representing a nonlinear process to be controlled is defined at step 402. This could include, for example, establishing mathematical equations that define the behavior of the process to be controlled. As a particular example, the model 142 could be defined in an on-line manner (based on data generated and collected related to the control of the process) or off-line (such as during step-testing). Any suitable technique could be used to generate the process model 142, and any suitable process model 142 could be defined (such as a flowsheet model or other nonlinear dynamic process model).

A control objective function is defined at step 404. This could include, for example, establishing an objective function 144 (such as that shown in Equation 27) that explicitly incorporates a minimum movement term, which can be used to help minimize manipulated variable movements during operation. Note that any suitable norm could be used to measure the manipulated variable movements and define the minimum movements. This may also include establishing an objective function 144 that explicitly incorporates an economic term, which can be used to optimize manipulated variable movements to satisfy the economic objectives of the controller.

A control model is defined at step 406. This may include, for example, establishing mathematical equations that can be used to define a funnel region during operation of a controller. The funnel region defines the dynamic feasible region of the control objective function. The control model could be defined in any suitable manner, such as by defining upper and lower trajectories of the funnel region.

The process model, objective function, and control model are combined to create a controller at step 408. In this example, steps 402-406 could be performed on a non-controller device, such as a server or operator station. The results of those steps can then be downloaded to a controller platform, such as by downloading the process model, objective function, and control model to one or more of the controllers 106a-106n over the network(s) 108.

The controller receives measurement data associated with the process to be controlled at step 410. This could include, for example, receiving measurement data associated with sensor readings of various controlled and disturbance variables. Unforced predicted values for one or more controlled variable are computed at step 412. This could include, for example, predicting the values of the one or more controlled variable based on current values of one or more manipulated or disturbance variables.

The funnel region is generated at step 414. This could include, for example, using the controlled variable predictions and the controller tuning parameters to define the funnel region. Note that the pseudo-code provided above could be used to determine an opening of the funnel region. Also note that if a controlled variable cannot be feasibly controlled at this point, the control model can be relaxed, such as by relaxing the control error equations in the control model 146 to achieve feasibility.

The control problem is solved at step 416. This could include, for example submitting the control problem to the NLP algorithm 148 for solution. The NLP algorithm 148 can solve the control problem in a manner that supports simultaneous optimization and control of the nonlinear process. The NLP algorithm 148 can also provide for minimum movements in manipulated variables when solving the control problem. Control signals for implementing the moves to the manipulated variables are output at step 418. This could include, for example, the controller generating control signals for one or more actuators, where the actuators are capable of adjusting operation of a process system in a manner that produces changes in the controlled variable.

At that point, the method 400 ends, and various steps in FIG. 4 could be repeated. For example, steps 410-418 could be repeated numerous times (such as at a specified interval) during the control of a process. Moreover, steps 402-408 could occur more infrequently, such as when a controller's performance degrades and new models and control problems are generated to improve its performance.

In particular embodiments, solving the control problem at step 416 involves solving a multi-level optimization problem. In this approach, the NLP algorithm 148 is called to solve a sequence of related problems instead of just one problem. This multi-level approach can be used to implement a control problem solution that involves several objectives of prioritized importance (such as k priorities for controlled variables). In these embodiments, each control variable is assigned a priority, and there are k distinct priority sets.

Lower priority values may represent higher priorities. The multi-level optimization problem could be solved by the NLP algorithm 148 as follows:

(a) minimize the control model error associated with priority "1" controlled variables;

(b) minimize the control model error associated with priority "2" controlled variables, subject to maintaining the priority "1" errors;

(c) continue and eventually minimize the control model error associated with priority "k" controlled variables, subject to maintaining the priority 1, . . . , k−1 errors;

(d) optimize the economic objective function subject to maintaining the minimized control model error already computed; and (e) minimize manipulated variable movements subject to maintaining the minimized control model error and the economic optimization already computed.

Although FIG. 4 illustrates one example of a method 400 for model predictive control of a nonlinear process, various changes may be made to FIG. 4. For example, while shown as a series of steps, various steps in FIG. 4 could overlap, occur in parallel, occur multiple times, or occur in a different order. Also, as noted above, the control solution for a process could be implemented using multiple controllers. In these embodiments, an upper-level controller could use the process model, objective function, and control problem to determine how to adjust the process. Lower-level controllers could then use outputs from the upper-level controller to make adjustments to the process being controlled.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "obtain" and its derivatives refer to any acquisition of data or other tangible or intangible item, whether acquired from an external source or internally (such as through internal generation of the item). The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining a process model that models a nonlinear process to be controlled, the nonlinear process comprising industrial production or processing equipment;
   obtaining an objective function that defines how the nonlinear process is controlled;
   obtaining a control model that defines a dynamic feasible region associated with a controlled variable, the controlled variable associated with a physical characteristic of the process;
   solving a control problem that includes the process model, the control model, and the objective function; and
   controlling the nonlinear process based on the solved control problem, wherein controlling the nonlinear process comprises generating and outputting a control signal to alter one or more manipulated variables associated with the process to thereby change the controlled variable;
   wherein the dynamic feasible region defined by the control model comprises a funnel region, the funnel region comprising a larger first portion and a smaller second portion following the first portion; and
   wherein greater flexibility is provided in meeting one or more control objectives for controlling the controlled variable in the first portion of the funnel region than in the second portion of the funnel region.

2. The method of claim 1, further comprising:
   when the controlled variable cannot be feasibly controlled within the funnel region, automatically relaxing one or more equations in the control model.

3. The method of claim 1, wherein the funnel region is defined in absolute form by an upper reference trajectory and a lower reference trajectory.

4. The method of claim 3, wherein each of the reference trajectories has a different initial condition.

5. The method of claim 1, wherein unforced controlled variable predictions are determined before the control problem is solved to establish an opening of the funnel region.

6. The method of claim 1, wherein the objective function comprises:
   at least one term for minimizing adjustments to the one or more manipulated variables; and
   at least one economic term for optimizing the adjustments to the one or more manipulated variables.

7. The method of claim 6, wherein solving the control problem and controlling the nonlinear process comprise:
   performing simultaneous control and optimization, where the adjustments to the one or more manipulated variables are chosen to meet the one or more control objectives and also, if possible and adequate flexibility exists, to optimize and minimize the adjustments to the one or more manipulated variables.

8. The method of claim 6, wherein the at least one term for minimizing the adjustments to the one or more manipulated variables comprises an $L_1$ norm.

9. The method of claim 1, wherein the objective function minimizes control error using an $L_1$ norm.

10. The method of claim 1, wherein solving the control problem and controlling the nonlinear process comprise:
predicting and controlling the controlled variable in accordance with a defined shape of the dynamic feasible region.

11. The method of claim 1, wherein:
the nonlinear process is associated with multiple controlled variables, the controlled variables having different priorities; and
solving the control problem comprises solving a multi-level optimization problem by:
minimizing control model error associated with each of the controlled variables, wherein minimizing the control model error associated with a controlled variable having a specified priority is subject to maintaining the minimized control model error associated with any controlled variables having a higher priority;
optimizing the objective function subject to maintaining the minimized control model errors; and
minimizing movements of the one or more manipulated variables subject to maintaining the minimized control model errors and the objective function optimization.

12. An apparatus comprising:
at least one memory configured to store:
a process model that models a nonlinear process to be controlled, the nonlinear process comprising industrial production or processing equipment;
an objective function that defines how the nonlinear process is controlled; and
a control model that defines a dynamic feasible region associated with a controlled variable, the controlled variable associated with a physical characteristic of the process; and
at least one processor configured to solve a control problem that includes the process model, the control model, and the objective function and to control the nonlinear process based on the solved control problem, wherein the at least one processor is configured to control the nonlinear process by generating and outputting a control signal to alter one or more manipulated variables associated with the process to thereby change the controlled variable;
wherein the dynamic feasible region defined by the control model comprises a funnel region, the funnel region comprising a larger first portion and a smaller second portion following the first portion; and
wherein greater flexibility is provided in meeting one or more control objectives for controlling the controlled variable in the first portion of the funnel region than in the second portion of the funnel region.

13. The apparatus of claim 12, wherein the at least one processor is further configured, when the controlled variable cannot be feasibly controlled within the funnel region, to automatically relax one or more equations in the control model.

14. The apparatus of claim 12, wherein the funnel region is defined in absolute form by an upper reference trajectory and a lower reference trajectory.

15. The apparatus of claim 12, wherein the at least one processor is further configured to determine unforced controlled variable predictions before the control problem is solved to establish an opening of the funnel region.

16. The apparatus of claim 12, wherein the objective function comprises:
at least one term for minimizing adjustments to the one or more manipulated variables; and
at least one economic term for optimizing the adjustments to the one or more manipulated variables.

17. The apparatus of claim 16, wherein the at least one processor is configured to solve the control problem and control the nonlinear process by:
performing simultaneous control and optimization, where the adjustments to the one or more manipulated variables are chosen to meet the one or more control objectives and also, if possible and adequate flexibility exists, to optimize and minimize the adjustments to the one or more manipulated variables.

18. The apparatus of claim 12, wherein the at least one processor is configured to solve the control problem and control the nonlinear process by executing a nonlinear programming algorithm and outputting one or more signals for controlling one or more actuators in the nonlinear process.

19. The apparatus of claim 12, wherein:
the nonlinear process is associated with multiple controlled variables, the controlled variables having different priorities; and
the at least one processor is configured to solve the control problem by solving a multi-level optimization problem, the at least one processor configured to solve the multi-level optimization problem by:
minimizing control model error associated with each of the controlled variables such that minimizing the control model error associated with a controlled variable having a specified priority is subject to maintaining the minimized control model error associated with any controlled variables having a higher priority;
optimizing the objective function subject to maintaining the minimized control model errors; and
minimizing movements of the one or more manipulated variables subject to maintaining the minimized control model errors and the objective function optimization.

20. A tangible computer readable medium embodying a computer program, the computer program comprising:
computer readable program code for solving a control problem that includes a process model, a control model, and an objective function, the nonlinear process implemented using industrial production or processing equipment; and
computer readable program code for controlling the nonlinear process based on the solved control problem, wherein the computer readable program code for controlling the nonlinear process comprises computer readable program code for generating and outputting a control signal to alter one or more manipulated variables associated with the process to thereby change a controlled variable;
wherein the process model models the nonlinear process to be controlled;
wherein the objective function defines how the nonlinear process is controlled;
wherein the control model defines a dynamic feasible region associated with the controlled variable, the controlled variable associated with a physical characteristic of the process;
wherein the dynamic feasible region defined by the control model comprises a funnel region, the funnel region comprising a larger first portion and a smaller second portion following the first portion; and wherein greater flexibility is provided in meeting one or more control objectives for controlling the controlled variable in the first portion of the funnel region than in the second portion of the funnel region.

21. The computer readable medium of claim 20, wherein:

the objective function comprises at least one term for minimizing adjustments to the one or more manipulated variables and at least one economic term for optimizing the adjustments to the one or more manipulated variables; and the computer readable program code for solving the control problem and controlling the nonlinear process comprises computer readable program code for simultaneous control and optimization, where the adjustments to the one or more manipulated variables are chosen to meet the one or more control objectives and also, if possible and adequate flexibility exists, to optimize and minimize the adjustments to the one or more manipulated variables.

22. The computer readable medium of claim 20, wherein:

the nonlinear process is associated with multiple controlled variables, the controlled variables having different priorities; and the computer readable program code for solving the control problem comprises computer readable program code for solving a multi-level optimization problem by:

minimizing control model error associated with each of the controlled variables such that minimizing the control model error associated with a controlled variable having a specified priority is subject to maintaining the minimized control model error associated with any controlled variables having a higher priority;

optimizing the objective function subject to maintaining the minimized control model errors; and minimizing movements of the one or more manipulated variables subject to maintaining the minimized control model errors and the objective function optimization.

* * * * *